United States Patent [19]
Worley

[11] 3,950,016
[45] Apr. 13, 1976

[54] FLEXIBLE FLUID-CONDUCTING ASSEMBLIES

[75] Inventor: Arthur C. Worley, Morristown, N.J.

[73] Assignee: Exxon Research and Engineering Company, Linden, N.J.

[22] Filed: Nov. 7, 1974

[21] Appl. No.: 521,832

[52] U.S. Cl. .............................. 285/114; 285/226
[51] Int. Cl.² ......................................... F16L 13/04
[58] Field of Search ........... 285/226, 264, 265, 114; 64/11 B, 16

[56] References Cited
UNITED STATES PATENTS

| | | | |
|---|---|---|---|
| 3,251,614 | 5/1966 | Woodsun | 285/262 X |
| 3,353,846 | 11/1967 | Peyton | 285/226 X |

FOREIGN PATENTS OR APPLICATIONS

| | | | |
|---|---|---|---|
| 844,370 | 8/1960 | United Kingdom | 285/226 |

Primary Examiner—Dave W. Arola
Attorney, Agent, or Firm—Donald F. Wohlers

[57] ABSTRACT

A flexible fluid-conducting assembly includes a pair of pipes which respectively terminate in free end regions which are adjacent but spaced from each other so as to define a predetermined gap between themselves. A flexible, fluid-tight, tubular sheet surrounds and is fluid-tightly fixed to the free end regions of the pipes and bridges the gap therebetween to prevent fluid from escaping through said gap outwardly beyond the fluid-tight, tubular sheet. An internal structure is fixed within the pipes internally thereof at their free end regions and extends through the gap for maintaining substantially unobstructed flow of fluid through the pipes while connecting the pipes to each other for at least limited turning movement, one with respect to the other, about at least one axis which is situated in the gap between the free end regions of the pipes.

3 Claims, 5 Drawing Figures

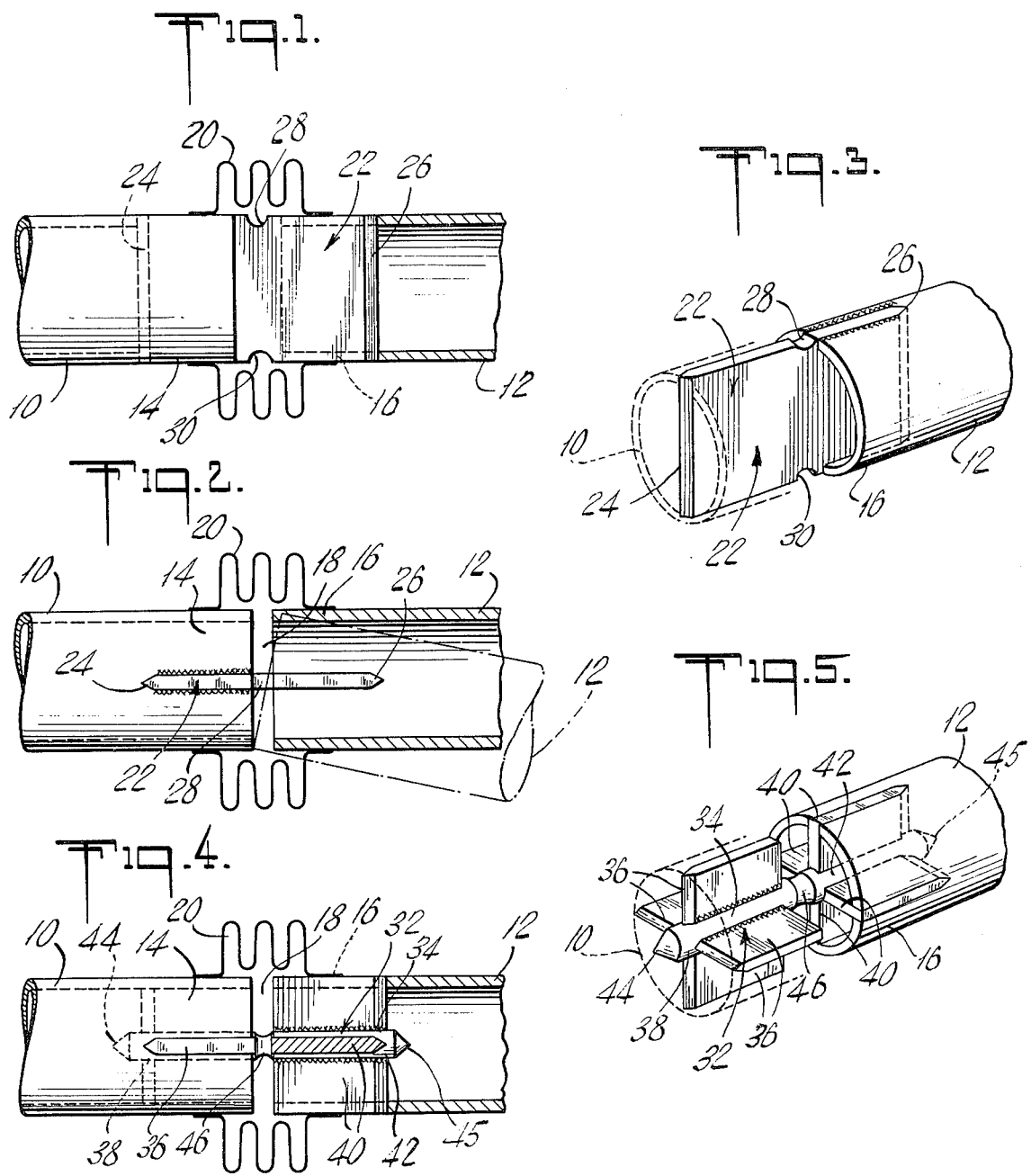

FLEXIBLE FLUID-CONDUCTING ASSEMBLIES

BACKGROUND OF THE INVENTION

The present invention relates to fluid-conducting assemblies such as an assembly of a pair of pipes connected to each other in such way that at least one of these pipes is capable of at least limited turning movement with respect to the other of the pipes, while at the same time fluid can flow continuously through the pipes.

The presently known structure for providing such connections between pipes suffers from several drawbacks. Thus, it is conventional, for example, to interconnect a pair of pipes by a suitable bellows or the like while a hinge assembly is fixed to the pipes at the exterior thereof and exterior of the bellows to enable at least one of the pipes to turn with respect to the other. One of the drawbacks inherent in such a construction resides in the fact that the exterior pipe-connecting structure requires a certain amount of space to be available at the exterior of the pipe, so that such conventional constructions can only be used with difficulty in situations where the pipe can be situated only in a limited space. A further and more important drawback of such conventional constructions resides in the fact that the exterior pipe-connecting structure is exposed to the ambient atmosphere creating an undesirable temperature differential between the pipe-connecting structure and the pipes themselves when the fluid which flows therethrough is at a temperature which is substantially different from the ambient temperature. For example, where the pipes are used for conveying a fluid at a temperature substantially higher than the ambient temperature, the exterior pipe-connecting structure will act in the same way as cooling fins, resulting not only in an undesirable reduction in the temperature of the fluid itself but also in the creation of undesirable stresses in the pipes and in the pipe-connecting structure. Yet another drawback encountered with conventional constructions of the above type resides in the fact that the bellows which interconnects the pipes has a length substantially corresponding to the distance between the pipes, so that an internal sleeve is required for properly conducting the fluid through the pipes. Also, if repair or maintenance operations require procedures such as, for example, replacing the bellows, it is necessary first to remove the outer pipe-connecting structure.

SUMMARY OF THE INVENTION

It is accordingly a primary object of the present invention to provide a fluid-conducting assembly which will avoid the above drawbacks while at the same time being sufficiently flexible to provide for at least limited turning movement of one pipe with respect to the other about at least one axis.

A further object of the present invention is to provide a construction of the above type which requires very little space beyond the exterior of the fluid-conducting pipes.

Furthermore, it is an object of the present invention to provide a construction of the above type which is capable of reliably maintaining a pair of pipes at a given distance from each other.

Also, it is an object of the present invention to provide a construction of the above type where a substantially unobstructed flow of fluid is maintained through the pipes.

In addition, it is an object of the present invention to provide a construction of the above types which can limit movement of one pipe with respect to the other to a turning movement about only one axis.

However, it is also an object of the present invention to provide a construction of the above type which is capable of interconnecting a pair of pipes in such a way that they can turn one with respect to the other about more than one axis.

According to the invention, the fluid-conducting assembly includes a pair of pipes which respectively terminate in a pair of free end regions which are adjacent but spaced from each other so as to define a predetermined gap between themselves. A flexible, fluid-tight, tubular sheet means surrounds and is fluid-tightly fixed to the free end regions of the pipes while bridging the gap therebetween for preventing fluid from flowing through the gap and outwardly beyond this tubular sheet means. An internal means is situated internally of the free end regions of the pipes where the internal means is fixed thereto for maintaining substantially unobstructed flow of fluid through the pipes while at the same time providing for at least one of the pipes at least a limited extent of turning movement with respect to the other of the pipes about an axis which is situated in the gap between the pipes.

BRIEF DESCRIPTION OF DRAWINGS

The invention is illustrated by way of example in the accompanying drawings which form part of this application and in which:

FIG. 1 is a longitudinal partly sectional elevation of one embodiment of the invention;

FIG. 2 is a top plan view of the structure of FIG. 1 with FIG. 2 showing in phantom lines how the right pipe of FIG. 2 can turn with respect to the left pipe;

FIG. 3 is a fragmentary perspective illustration of the structure of FIGS. 1 and 2 without the bellows and with a part of the left pipe of FIG. 3 being shown in phantom lines;

FIG. 4 is a longitudinal partly sectional elevation of another embodiment of a fluid-conducting assembly according to the invention with the structure at the right part of FIG. 4 being shown in section; and FIG. 5 is a perspective illustration of the embodiment of FIG. 4 without the bellows and with a part of the left pipe of FIG. 5 also being shown only in phantom lines.

DESCRIPTION OF PREFERRED EMBODIMENTS

Referring first to FIGS. 1–3, there are illustrated therein a pair of pipes 10 and 12 through which any desired fluid is adapted to flow in either direction. The pipes 10 and 12 respectively terminate in the free end regions 14 and 16 which are situated adjacent but spaced from each other so as to define between themselves the gap 18.

A flexible, fluid-tight, tubular sheet means 20, in the form of a suitable bellows, for example, surrounds the free end regions 14 and 16 where the sheet means 20 is fixed to the free end regions 14 and 16 in any suitable fluid-tight manner. This sheet means 20 bridges the gap 18 and serves to prevent fluid which flows through the pipes 10 and 12 from escaping through the gap 18 and outwardly beyond the sheet means 20.

An internal means 22 is situated internally of the pipes 10 and 12 at the free end regions thereof where the internal means is fixed to the pipes. In the example of FIGS. 1–3, the internal means 22 consists in its entirety of a single elongated plate having in the interior of the end regions 14 and 16 flat portions respectively situated in planes which contain the axes of the pipes 10 and 12. The portions of the plate 22 which are situated within the free end portions 14 and 16 are fixed at their opposed side edges directly to the pipes 10 and 12 as by being welded thereto. The plate 22 terminates in a pair of opposed end regions 24 and 26 which are respectively of substantially V-shaped cross section so as to have a streamlined configuration with respect to fluid flowing through the pipes.

It is thus apparent that the internal means 22 interconnects the pipes 10 and 12 for maintaining substantially unobstructed flow of fluid therethrough. In addition, the internal means 22 interconnects the pipes 10 and 12 for providing at least a limited extent of turning movement of at least one of the pipes with respect to the other about an axis which is situated in the gap 18 between the free end regions 14 and 16 of the pipes. As is apparent from FIG. 2 where the pipe 12 is shown in phantom lines in a position where it is angularly deflected with respect to the pipe 10, the turning axis provided by way of the internal means 22 is situated substantially at the intersection of the planes which contain the portions of the internal means 22 which are fixed to the pipes in the interior of the free end regions thereof. It will be noted that with this construction the internal means substantially prevents any movement of the pipes with respect to the other except about the above axis. Moreover, as is clearly apparent from FIG. 2, the free end regions 14 and 16 of the pipes are situated from each other by a distance which is small enough to limit the degree of turning of one of the pipes with respect to the other by engagement of one of the free end regions with the other. Obviously, the axial length of the gap 18 relative to the pipe diameter will determine the limits of turning of one pipe relative to the other.

Thus, with the invention a single unitary body extends from one to the other of the free end regions of the pipes across the gap therebetween with this body bending in the gap 18 to provide the limited degree of relative movement. In order to assure that the plate 22 will bend at the desired location, opposed edges thereof are formed with circular notches 28 and 30 in the gap 18 so that the part of the unitary body which forms the plate 22 has a reduced cross section at the location where bending takes place. If desired, the notches 28 and 30 may be extended toward the pipe center to increase the joint flexibility.

In order to provide for the possibility of turning of one of the pipes with respect to the other about more than one axis, the embodiment of FIGS. 4 and 5 may be used. In this embodiment, the pipes 10 and 12 and the sheet means 20 may be identical with those of FIGS. 1–3. The internal means 32 of FIGS. 4 and 5 also includes an elongated, one-piece body which extends from the interior of one of the free end regions across the gap 18 to the interior of the other of the free end regions with the capability of bending in the gap 18 so as to provide movement of one pipe with respect to the other. In this embodiment, this one-piece, bendable body of the internal means 32 takes the form of an elongated rod 34 which has in the free end regions 14 and 16 elongated portions which are respectively coaxial with the pipes 10 and 12. A plurality of fins 36 are fixed, as by welding, to the elongated portion 38 of rod 34 which is situated in the free end region 14. In the same way a plurality of fins 40 are fixed, as by welding, to the elongated portion 42 of rod 34 which is situated in the free end region 16. In the illustrated example there are four fins 38 and four fins 40, and all of these fins are fixed, as by welding, at their outer edges to the walls of the pipes 10 and 12. All of the fins 36 and 40 terminate distant from the gap 18 in edge regions of substantially V-shaped configuration so as to provide for streamlined flow of the fluid with respect to the fins. In the same way the rod 34 terminates in a pair of opposed tapered, substantially conical ends 44 and 46 which may be substantially pointed, as illustrated, to contribute in this way also to the streamlined flow of the fluid.

In the gap 18 the rod 34 is formed with a cricumferential groove 46 so that in this case also the unitary body which extends across the gap has in the gap an intermediate region of reduced cross section to assure bending of the rod 34 in the gap 18. As before, the cross sectional area of rod 34 at the groove 46 may be sized in accordance with the desired joint flexibility.

In the illustrated example the fins 36 are situated in a pair of mutually perpendicular planes and the fins 40 are also situated in a pair of mutually perpendicular planes, which are the same as the planes containing the fins 36 when the rod 34 is straight, so that with this construction turning of one of the pipes with respect to the other about a pair of mutually perpendicular axes is provided with a gimbal type of internal pipe joint. It will be noted that in the case of FIGS. 4 and 5 the free end regions 14 and 16 of the pipes 10 and 12 are also located close enough to each other to limit the degree of turning by direct engagement of one of the free end regions with the other.

It will be noted that with the above-described embodiments of the invention the axial dimension of the gap 18 is considerably shorter than the axial dimension of the bellows 20 so that an internal sleeve is not required. Furthermore, the internal means 22 and 32 by being fixed directly to the pipes 10 and 12 maintain them connected to each other in a manner preventing them from moving longitudinally towards or away from each other so as to determine the axial dimension of the gap 18. Furthermore, since the internal means of both embodiments is directly engaged by the fluid flowing through the pipes, there is no undesirable temperature differential between the fluid in the pipes and the pipe-connecting structure. It will be noted, furthermore, that because the internal means of the invention limits the axial dimension of the gap 18, the bellows 20 is protected by the internal means of the invention from longitudinal axial forces.

Moreover, it should be noted that if in any given case it is required to replace a bellows, such an operation can be carried out very conveniently because the internal means of the invention is situated inwardly of the bellows rather than at the exterior thereof.

A construction of the type shown in FIGS. 1–3 is particularly suitable for low cycle, high temperature service when short piping runs are desirable, such as in cross-overs for steam cracker furnaces between convection and radiant sections. Also, such a construction can be used to support grids for cokers. In such assemblies, the structure of the invention serves the dual function of supporting the grid and conveying air thereto during operation.

With either of the above constructions, the internal means may be made of any suitable material such as a special alloy material which has the required strength as well as fatigue and corrosion resistant properties in view of the particular use which is to be made of the pipe and the internal means of the invention connected thereto.

The gimbal pipe connection shown in FIGS. 4 and 5 is also particularly suited for low cycle, high temperature service such as in short two and three plane piping runs where large thermal expansion movements are possible. Such uses are required, for example, in furnace cross-overs (in particular steam cracker furnace cross-overs, as is the case with the embodiment of FIGS. 1–3) between the convection sections and radiant sections where two plane and three plane piping systems are required. For such furnaces, it is necessary to employ cross-overs of extreme length to ensure that the cross-over piping reaction due to the radiant coil thermal movements do not impose loads on the radiant coil due to the spring action of the cross-overs. The spring load, even though of low magnitude, can lead to buckling of the radiant coil since the coil operates at temperatures at or about 1700°F. At this temperature, the coil is susceptible to buckling or deformation by small external pipe loads. The force at which a joint of the invention yields by bending at plate 22 or rod 34 will only be a fraction of that required for deflecting the cross-over pipe.

What is claimed is:

1. In a fluid-conducting assembly, a pair of pipes respectively having open free end regions situated adjacent but spaced from each other for defining a predetermined gap therebetween, fluid-tight, flexible tubular sheet means surrounding and fluid-tightly connected with said free end regions exterior of said pipe and bridging said gap therebetween for preventing fluid from escaping through said gap, and single plate means having portions situated internally of said free end regions of said pipes, said plate means comprising a planar one-piece body of uniform thickness throughout its length and being of a width corresponding to the inside diameter of said pipes and extending continuously from the interior of the free end region of one of said pipes across said gap to the interior of the free end region of the other of said pipes, means securing the edges of said plate means to the interior of said free end regions of said pipes, said body having in said gap an intermediate portion including a pair of opposed semi-circular notches formed in the edges of said plate means to thereby reduce the stiffness thereof in the plane of said gap to permit said pipes to bend about an axis defined by the intersection of the plane of said gap with the plane of said plate means.

2. The combination of claim 1 and wherein said plate means terminates in said free end regions in a pair of opposed end edge regions of substantially V-shaped cross sections so as to have streamlined configurations with respect to a fluid flowing in said pipes.

3. In a fluid-conducting assembly, a pair of pipes respectively having open free end regions situated adjacent but spaced from each other for defining a predetermined gap between themselves, fluid-tight, flexible tubular sheet means surrounding and fluid-tightly connected with said free end regions exterior of said pipe and bridging said gap therebetween for preventing fluid from escaping through said gap, and internal means having portions situated internally of said free end regions of said pipes, said internal means comprising a pair of plate means intersecting at substantially right angles located within the end region of each pipe, each plate means being of a width corresponding to the inside diameter of said pipes, means securing the edges of each of said plate means to the inside of said free end regions of said pipes, and an integral pipe connecting member extending coaxially of said pipes in the free end regions thereof rigidly secured to the intersections of each of said pair of plate means, said connecting member consisting of a rigid, one-piece circular rod member having a semicircular annual groove in a central portion thereof in alignment with said gap to thereby decrease the effective diameter and stiffness of said rod in the plane of said gap to permit flexure of said pipes at said gap.

* * * * *